United States Patent [19]

Kato

[11] Patent Number: 5,013,369
[45] Date of Patent: May 7, 1991

[54] METHOD OF CLEANING BOTTOM OF FEEDING CHANNEL FOR FISH AND APPARATUS THEREOF

[76] Inventor: Hiroshi Kato, 1268-1, Tate-machi, Hachiouji-shi, Tokyo, Japan

[21] Appl. No.: 390,444

[22] Filed: Aug. 2, 1989

Related U.S. Application Data

[63] Continuation of Ser. No. 943,074, Dec. 18, 1986, abandoned.

[30] Foreign Application Priority Data

Dec. 18, 1985 [JP] Japan ................... 60-285305

[51] Int. Cl.⁵ .............................. B08B 3/02
[52] U.S. Cl. ........................ 134/24; 134/15; 134/22.12; 134/22.18; 210/169; 210/195.1; 210/151; 210/320; 119/3
[58] Field of Search ............. 210/169, 195.1, 150, 210/151, 320, 515, 525, 523, 522; 119/3; 134/15, 22.18, 24

[56] References Cited

U.S. PATENT DOCUMENTS

| | | | |
|---|---|---|---|
| 4,043,299 | 8/1977 | Birkbeck et al. | 119/3 |
| 4,067,809 | 1/1978 | Kato | 210/195.1 |
| 4,093,546 | 7/1978 | Taborsky | 210/150 |
| 4,202,778 | 5/1980 | Middelbeek | 210/522 |

FOREIGN PATENT DOCUMENTS

2543622  3/1977  Fed. Rep. of Germany ... 134/22.18

Primary Examiner—Asok Pal
Attorney, Agent, or Firm—Birch, Stewart, Kolasch & Birch

[57] ABSTRACT

A method of cleaning the bottom of a feeding channel supplied fresh water to be fed to fish such as fry of salmon and trout is disclosed in which a baffle means for preventing the flow of water in the feeding channel is maintained to the orientation such as to extend upwardly from the height position spaced apart upwardly from the bottom to block the flow of water in the channel while the baffle means is moved in the channel from the upstream side to the downstream side, thereby collecting the deposit in the channel toward the downstream side of the channel due to the flow of water passing through the gap between the bottom and a lower edge of the baffle means. An apparatus for cleaning the bottom of a feeding channel comprises a baffle means disposed in the feeding channel and movable from the upstream side to the downstream side so as to block the flow of water in the channel which is supplied with fresh water thereto and a means for maintaining the baffle means to the orientation such as to extend upwardly from the height position spaced apart upwardly from the bottom to block the water flow in the channel while the baffle means is moved in the channel.

7 Claims, 6 Drawing Sheets

METHOD OF CLEANING BOTTOM OF FEEDING CHANNEL FOR FISH AND APPARATUS THEREOF

This application is a continuation, of application Ser. No. 06/943,074 filed on Dec. 18, 1986, now abandoned.

BACKGROUND OF THE INVENTION

1. Field of the Invention:

This invention relates to a method of cleaning the bottom of a channel for feeding fish and an apparatus thereof and, more particularly to a method and an apparatus suitable for cleaning the bottom of a feeding channel for fry of salmon, trout or the like.

2. Description of the Background Art:

The incubation of salmon and trout such as pink salmon, masou salmon, trout, char and like fish usually comprises a breeding step, in which fertilized eggs are bred, a repose period control step for controlling a repose period of yoke sac fry in an incubation channel where fresh water flows at all time, and a feed step, in which free swimming fry in a free swimming period after the repose period is fed in a feeding channel where fresh water flows at all time.

A feeding channel having substantially the flat bottom free from the inclination is used for feeding of free swimming fry. The feeding channel is supplied fresh water at all time such as to maintain the flow of water in said channel to a predetermined velocity. The grown free swimming fry is transferred from the incubation channel to said feeding channel and further the bait for the free swimming fry is sprayed over said channel.

The feeding channel may be used as the incubation channel. In this case, a member, i.e., gravels disposed in the incubation channel in order to provide a repose place for the yolk sac fry is removed from the incubation channel.

A deposit forms on the bottom of the feeding channel which is precipitated by the resisual of the bait sprayed therein, excrements of fish and mud or the like. The deposit noted above is widely distributed over the entire surface of the bottom and flows up through the water to disperse therethrough. In this case, the water is liable to contaminate. When the deposit is left on the bottom as it is, corrosion of said deposit produces the pathogenic bacteria of fish and fur or the like, thereby rapidly contaminating the inside of the feeding channel and is liably to produce fish deseases and oxegen starvation or the like. As a result, it has been desired that the feeding channel should be cleaned by entirely removing the deposit produced over the entire surface of the bottom of channel as frequently as possible, i.e., every day or every few days.

One of an apparatus for cleaning the bottom of the feeding channel has been disclosed in which a cleaner enters the channel to withdraw the deposit by using an elongate pipe and a suction pump. However, the apparatus noted above is liable to suck up fry on the bottom even when the suction force of the suction pump is reduced. Further, according to the apparatus, an end of said pipe should be moved by hand slowly along the bottom of the channel while paying attention so as not to disturb the deposit through the water. Therefore, it takes much time for cleaning and is substantially impossible to clean each bottom of a plurality of feeding channels every day or every one or other day. As a result, from the practical point of view, the apparatus noted above is merely used for occasionally removing the deposit which is locally collected on the bottom of the feeding channel and is clearly visible to the eye.

Thus, there has been developed up to now an apparatus for removing efficiently and economically the deposit which is liable to disturbed through water from the bottom and widely distributed over the entire surface of the bottom without contaminating the channel even when the deposit is dispersed through the water and damaging the fry. Therefore, only the occasional removal of the deposit which particularly leaps to the eye has been conventionally performed. The entire surface of the bottom of the feeding channel has not been cleaned during the feeding period of fry but cleaned after said period.

SUMMARY OF THE INVENTION

It is an object of the present invention to provide a method of cleaning the bottom of a feeding channel and an apparatus thereof, which may be efficiently and economically used for removing the deposit produced on the whole bottom during the feeding period of fry, without contaminating water and damaging the fry.

Another object of the present invention is to provide a method of cleaning the bottom of a feeding channel and an apparatus thereof, which may be automatically cleaned by utilizing the flow of water in the channel.

In accordance with the present invention, there is method for cleaning the bottom of a feeding channel which is supplied with fresh water thereto, said method comprising a step of maintaining a baffle means for preventing the flow of water in said channel to the orientation so as to extend upwardly from the height position spaced apart upwardly from the bottom and then block the flow of water in said channel while moving said baffle means in said channel from the upstream side to the downstream side, thereby collecting the deposit in said feeding channel toward the downstream side of said channel by the flow of water passing through a gap between said bottom and a lower edge of said baffle means.

In accordance with the present invention, there is provided an apparatus for cleaning the bottom of a feeding channel which is supplied with fresh water thereto, said apparatus comprising a baffle means disposed in said channel and movable from the upstream side to the downstream side such as to block the flow of water in said channel and a means for maintaining said baffle means to the orientation so as to extend upwardly from the height position spaced apart upwardly from said bottom and then block the flow of water in said channel while said baffle means is moved in said channel.

The cleaning apparatus according to the present invention is disposed at the upstream side in the feeding channel such that said baffle means extends upwardly from the height position spaced apart upwardly from the bottom to block the flow of water in said channel. Thus, since hydraulic pressure upstream from the position of the baffle means is increased greater than that downstream following the supply of fresh water to the feeding channel, water upstream from the position of the cleaning apparatus flows along the bottom through a gap between the baffle means and the bottom of the channel toward the side downstream from the position of the baffle means as blownoff flow. The hydraulic pressure of the blownoff flow causes the deposit produced on the bottom in the neighborhood of the gap to collect toward the side downstream from the position of the gap.

The cleaning apparatus is moved toward the downstream side successively by the water flow in said feeding channel or other force such as dynamic force at a speed such that the hydraulic pressure upstream from the position of the baffle means is increased greater than that downstream, i.e., a speed so as to maintain said blownoff flow, after the disposal of said apparatus in said channel. At this time, since the baffle means is moved under such a condition that it maintains a predetermined height position from the bottom by an orientation maintaining means, the deposit on the bottom is successively transferred such as to flow together toward the side downstream from the position of said baffle means together with the movement of the baffle means. The baffle means is finally moved to the downstream end of the feeding channel, thereby collecting the deposit at the most downstream position of said channel.

Thus, while the baffle means is moved in the feeding channel from the upstream side toward the downstream side, the deposit on the whole surface of the bottom is collected toward the downstream end. The collected deposit may be discharged to the outside of the feeding channel through a pipe of an apparatus similar to a prior one. This deposit discharging operation may be easily done since the area to be discharged is narrower than that of a prior art apparatus for performing the discharging operation over the entire surface of the bottom.

When the deposit is transferred due to said blownoff flow, there is no possibility to disturb the deposit through the water too much. Further, even when the deposit is flown up through the water, it occurs downstream from the position of the baffle means to discharge from the feeding channel without moving the water downstream from the position of the baffle means toward the side upstream thereof. In this case, the water upstream from the baffle means is not contaminated.

The fry in the feeding channel is moved to the side upstream from the position of the baffle means by swimming through the gap between the baffle means and the bottom against the blownoff flow at the step of moving the baffle means gradually. Therefore, the fry is not damaged.

The dimension of the gap between the baffle means and the bottom, moving speed of the cleaning apparatus and an area of the apparatus receiving the hydraulic pressure or the like may be adjusted to an optimum value so as to transfer the deposit naturally and smoothly without disturbing the deposit too much due to the blownoff flow from the gap.

The baffle means comprises a rectangular frame, at least one baffle attached to said frame so as to close an opening of said frame, for blocking the water flow in said feeding channel at the time of disposal of said baffle means in said channel, a blade attached to a lower edge of said frame so as to extend longitudinally of said lower edge and project downwardly, and a pair of tongue piece attached to the opposite sides of said frame so as to close the gap between the side wall of said feeding channel and said frame during the movement of said baffle means in said channel. Said baffle is preferably provided with a first plate member fixedly provided at the lower portion of said frame and a second plate member disposed above said first plate member and supported to said frame so as to be movable in the vertical direction. Such baffle noted above may be adjusted to the water flow passing through the gap between the baffle means and the bottom to an optimum velocity by adjusting the gap between said first and second plate members to a predetermined value.

Said orientation maintaining means is preferably provided with a plurality of support mechanism disposed at a lower end of said baffle means and attached at positions spaced apart in the direction of crossing said water flow. The support mechanisms support said baffle means and are adjustable for the height position of said baffle means during the movement of said baffle means in said feeding channel. Each support mechanism noted above may be set to the velocity of the blownoff flow passing through said gap to an optimum value by adjusting the dimension of the gap between said bottom and said baffle means by said support mechanisms.

Further, said orientation maintaining means is preferably provided with a pair of orientation correction mechanisms attached at the opposite ends of said baffle means. The orientation mechanisms contact the side surface of said feeding channel to correct the orientation of said baffle means to the orientation for blocking the water flow in said channel when the orientation of said baffle means is to be changed. According to the orientation maintaining means provided with the orientation correction mechanisms, the change of the baffle means into the orientation not to block the water flow is prevented, thereby preventing the deposit to be disturbed through the water, the fry to be damaged and making it impossibility of the cleaning.

BRIEF DESCRIPTION OF THE DRAWINGS

The other objects and features of the invention will become apparent from the following description of preferred embodiments of the invention with reference to the accompanying drawings, in which.

DETAILED DESCRIPTION OF PREFERRED EMBODIMENTS

Figure 1:
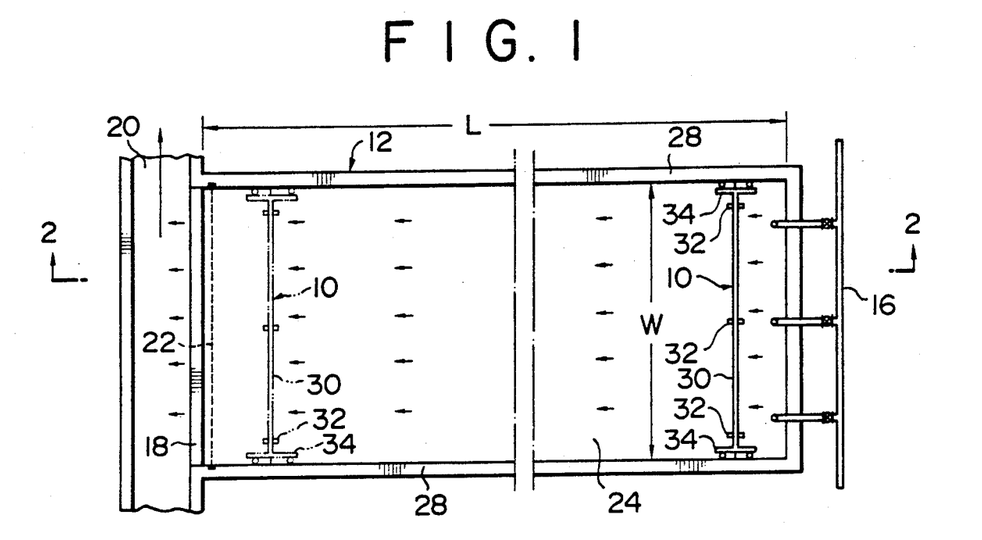
FIG. 1 is a plan view showing an embodiment of the rectangular feeding channel disposed in a cleaning apparatus for cleaning the bottom of the channel according to the present invention therein.
Figure 2:
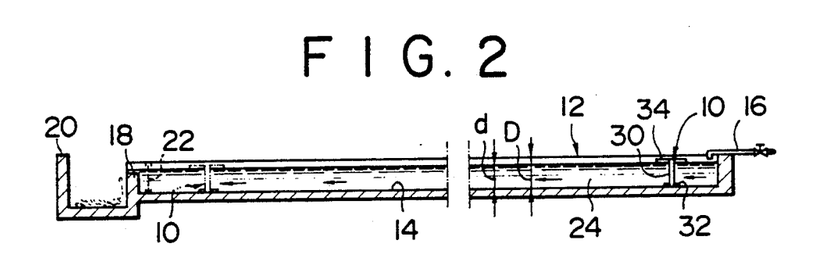
FIG. 2 is a sectional view taken along the line 2—2 in FIG. 1.

Referring to FIGS. 1 and 2, a cleaning apparatus 10 is disposed in a feeding channel 12 installed in an incubation place such as breeding place. The feeding channel 12 in the embodiment shown in the drawing is an elongate channel with a length "L" of 10 to 25 m, a width "W" of 1.5 to 10 m and a depth "D" of 70 to 80 cm, and water flows through the channel. A bottom 14 of the channel is substantially flat and free from inclination. At one end of the channel 12 in the longitudinal direction, water supply equipment 16 is disposed for supplying fresh water into the channel 12. On the contrary, at the other end of the channel 12 a drop structure 18 or weir and an outlet 20 are provided for receiving the water passed over said drop structure to flow out. Further, a screen 22 for preventing fry from flowing away to the outlet is provided at the side of the drop structure 18 in the channel 12.

By supplying fresh water from the water supply equipment 16 at all time, water 24 in the channel 12 flows from the side of the water supply equipment 16 toward the drop structure 18 and then overflows from the drop structure 18 to flow into the outlet 20. The depth "d" of the water 24 is defined by the drop structure 18 to 40 to 60 cm, for example. The amount of water supplied from the water supply equipment 16 is adjusted to a value at which the water 24 flows at a velocity of 5 to 80 cm/min. at all time.

Figure 3:
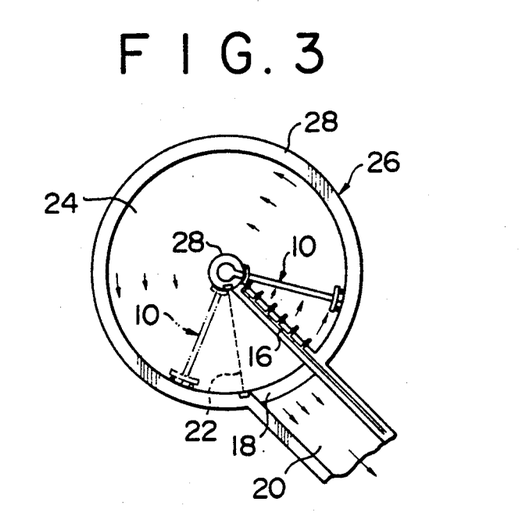
FIG. 3 is a plan view showing an embodiment of the circular feeding channel disposed the cleaning apparatus according to the present invention therein.

The feeding channel 12 may be made of concrete, plastic or other material. One or more channels are installed according to the scale of the incubation place. Further, the cleaning apparatus 10 may be applicable to a circular channel 26 as shown in FIG. 3.

The cleaning apparatus 10 comprises a baffle assembly 30 disposed between side walls 28 widthwise of the channel 12 so as to block the water flow in the feeding channel 12. The baffle assembly has an elongate planar shape having the size approximately similar to the width "W" and depth "D" of the channel 12. The baffle assembly 30 is disposed in the channel 12 so as to extend vertically and widthwise of the channel 12 to black the water flow of the channel 12 by a plurality of support mechanisms 32 disposed at positions spaced apart in the longitudinal direction (widthwise of the channel 12) of a lower end of said assembly and a pair of orientation correction mechanisms 34 disposed at the opposite ends of the assembly 30 in the longitudinal direction.

Figure 4:
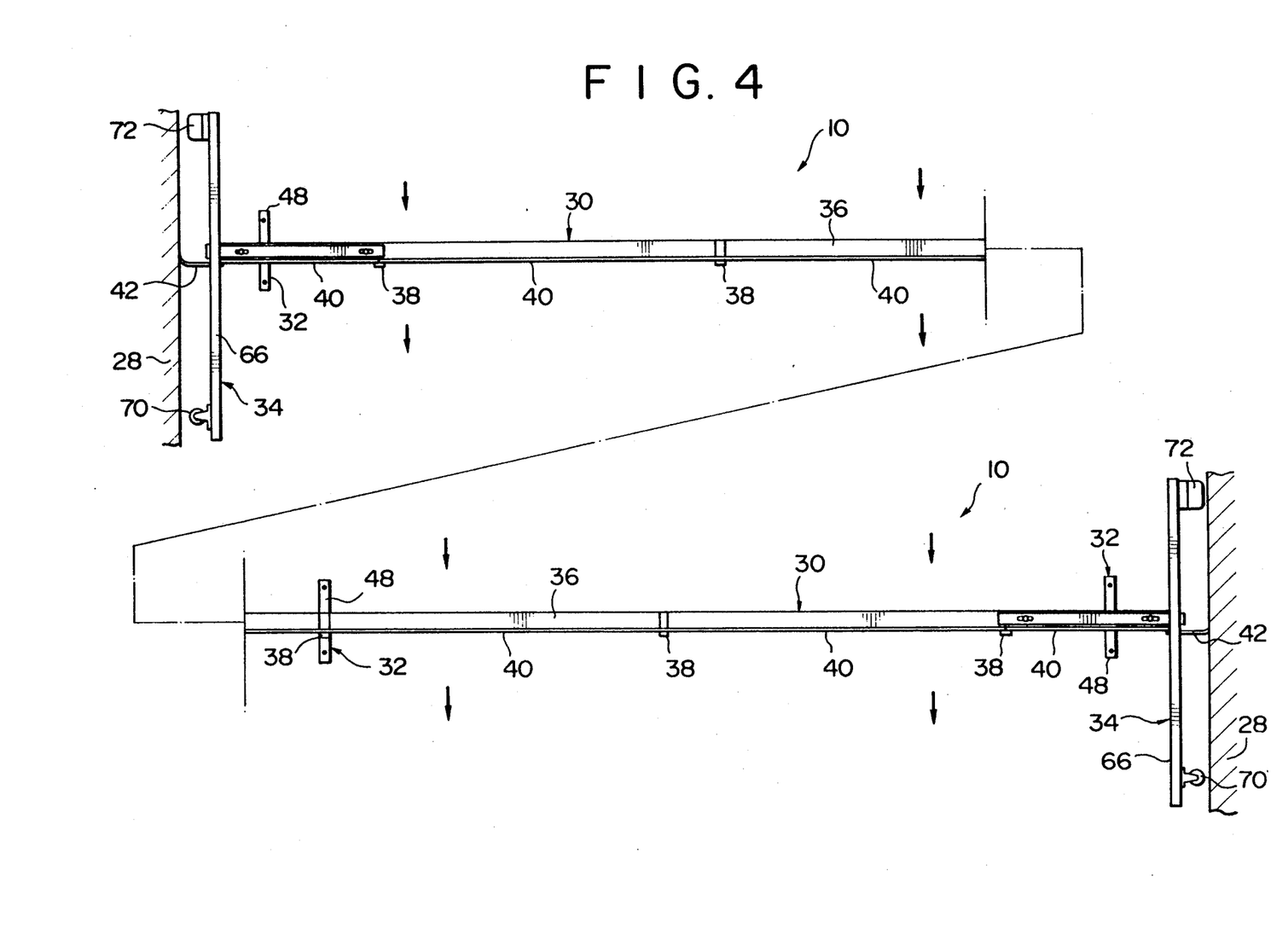
FIG. 4 is a plan view showing the embodiment of the cleaning apparatus according to the present invention.
Figure 5:
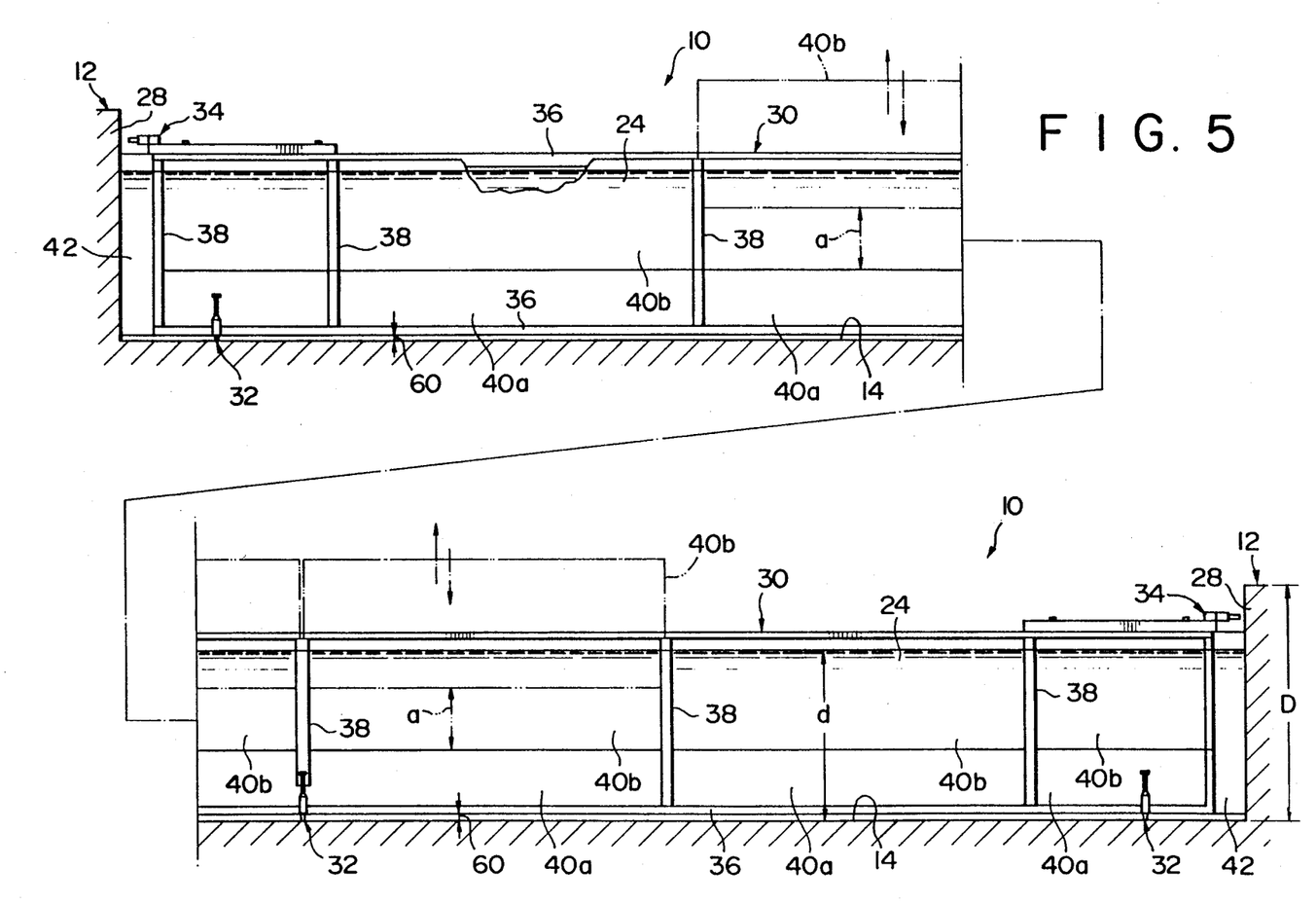
FIG. 5 is a front view showing the cleaning apparatus shown in FIG. 4.

As shown in FIGS. 4 and 5, the baffle assembly 30 includes a rectangular frame 36 having a shape approximately corresponding to the cross-sectional area of the channel 12. The frame comprises an upper frame member, a lower frame member and a plurality of vertical frame members, each frame member consisting of an elongated member such as a rectangular pipe made of a stainless steel. Said frame is formed by firmly coupling the upper and lower frame members and the vertical frame members with each other at a plurality of positions in the longitudinal direction of the upper and lower frame members. The frame 36 is defined into a plurality of areas by a plurality of elongate case members 38 arranged at positions spaced apart in the longitudinal direction of said upper and lower frames and at the oposite ends of the frame 36 so as to extend vertically. A plurality of baffles 40 such as a vinyl chloride plate are disposed at each area so as to close an opening of the frame 36.

As shown in FIG. 5, each baffle 40 is divided into upper and lower plate members 40b and 40a. Each lower plate member 40a is secured to the lower portion of the adjacent case members 38. On the contrary, each upper plate member 40b is supported to the adjacent case members 38 so as to be movable in the vertical direction. Each case member 38 is provided with a fastening member (not shown) such as at least one screw for detachable fixing the upper plate member 40b to the position spaced upwardly by a predetermined distance "a" from the lower plate member 40a as shown by two chain lines in FIG. 5.

Respective vertical frame members at the opposite ends of the frame 36 in the longitudinal direction are provided with tongue pieces 42 made of an elastically deformable material such as rubber. Each tongue piece 42 contacts the side wall 28 widthwise of the channel 12 and extends vertically of the end of the frame 36 so as to close a gap between the baffle assembly 30 and the side wall 28 and projects toward the side wall 28 of the channel 12 when the cleaning apparatus 10 is disposed in the channel 12. A blade 44 having a L-shaped section is secured to the lower frame member of the frame 36. The blade 44 extends along a lower edge of the frame 36 to project downwardly.

Figure 6:
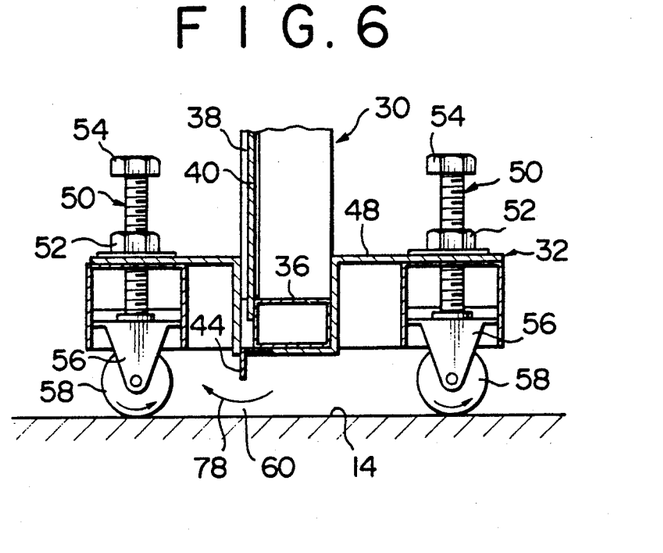
FIG. 6 is an enlarged-scale sectional view showing a support mechanism.

Each support mechanism 32 comprises an arm 48 secured to the lower frame member of the frame 36 by a means such as at least one screw as shown in FIG. 6 showing one of the support mechanisms. The arm extends from the frame 36 toward the upstream side and downstream side of the channel 12. A paid of screw jacks 50 are disposed at the opposite ends of the arm 48. Each screw jack 50 includes a nut 52 attached to the frame 36 and a bolt 54 screwed into said nut to extend vertically. A pair of brackets 56 are supported to the respective lower ends of the bolt 54. Each support member 58 is supported to the bracket 56 so as to contact the bottom 14 to maintain a predetermined gap 60 between the bottom 14 and the lower edge of the blade 44 when the cleaning apparatus 10 is disposed in the channel 12.

Each support member 58 is a caster such as rubber caster in the embodiment shown in the drawing and supported rotatably about the axis extending widthwise of the channel 12. Each caster 58 contacts the bottom 14 to maintain the predetermined gap 60 between the bottom 14 and the lower edge of the blade 44 when the cleaning apparatus 10 is disposed in the channel 12. The dimension of the gap 60 may be adjusted by the screw jacks 50 and is usually set to about 1 to 5 cm. A cubic slider contacting the bottom 14 to be slidable may be used as the support members 58 instead of the caster. Further, one of the support members may be used as the caster and the other may be used as the slider.

Figure 7:
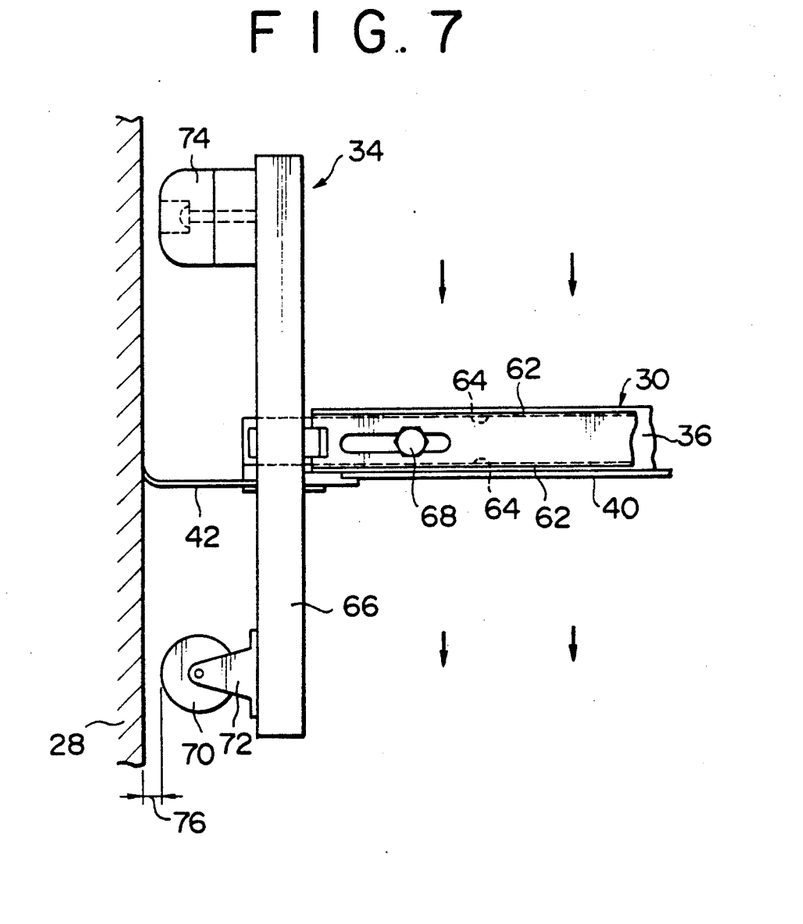
FIG. 7 is an enlarged-scale plan view showing an orientation correction mechanism.

Each orientation correction mechanism 34 is provided with a guide tube 62 secured to opposite ends of upper frame member of the frame 36 as shown in FIG. 7 showing one of the mechanisms. A first arm 64 is movable inserted into the guide tube from the edge of the frame 36. A second arm 66 is secured to an end of the lateral arm. The first arm 64 is detachably secured to the guide tube 62 by a bolt 68. The second arm 66 projects from the edge of the frame 36 to extend in the flowing direction of the water 24. The projection amount of the second arm 66 projected from the guide tube 62 may be adjusted by the securement position of the first arm 64 against the guide tube 62.

A bracket 72 for a caster 70 is disposed at the side wall 28 of the channel 12 of the first arm 66 and attached at one end of the first arm. A rubber pad 74 is attached at the other end of the first arm by a screw.

The orientation correction mechanisms 34 are attached to the baffle assembly 30 such that the caster 70 is located at the downstream side, the pad 74 is located at the upstream side and a predetermined gap 76 is formed between the caster 72 and pad 74 and the side wall 28, when the cleaning apparatus 10 is disposed in the channel 12. The gap 76 is usually set to about 1 cm.

At the time of cleaning, when the cleaning apparatus 10 is disposed in the channel 12, the gap 60 between the bottom 14 and the lower edge of the blade 44, the gap 76 between the caster 70 and pad 74 of the orientation correction mechanism 34 and the side wall 28 and the gap "a" between the lower and upper plate members 40a and 40b may be adjusted such that the velocity of the water passing through the gap 60 reaches a predetermined value.

After that, the cleaning apparatus 10 is disposed at the most upstream position in the channel 12 such that the baffle assembly 30 is positioned vertically, the tongue piece 42 of the baffle assembly 30 contacts the side wall 28 of the channel 12, the caster 58 of the support mechanism 32 contacts the bottom 14, the caster 70 of the orientation correction mechanism 34 is located at the downstream side and the pad 74 is located at the upstream side.

Figure 8:
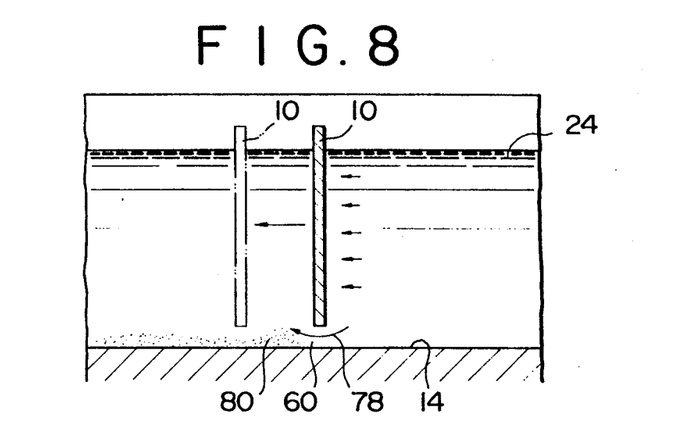
FIG. 8 is a view for explaining the principle of cleaning according to the present invention.

When the cleaning apparatus 10 is disposed in the feeding channel 12 as noted above, fresh water is supplied from the water supply equipment 16 into the channel 12 at all time. In this case, the baffle assembly 30 acts as a water flow resisting member for blocking the flow of the water 24 to increase the hydraulic pressure upstream of the position of the baffle assembly 30 greater than that downstream from said position of the assembly. Accordingly, since the baffle assembly 30 is maintained at the predetermined height position from the bottom 14 by the support mechanisms 32, the water flowing upstream from the position of the baffle assembly 30 flows out along the bottom 14 from the gap 60 between the blade 44 and the bottom 14 to the side downstream from the position of the baffle assembly 30 as a blownoff flow 78. Deposit 80 produced on the bottom 14 in the neighborhood of the gap 60 may be blown out to the side downstream from the position of the baffle assembly 30 due to the hydraulic pressure of the blownoff flow 78.

Further, the cleaning apparatus 10 may be moved automatically toward the downstream side gradually since the baffle assembly 30 receives the hydraulic pressure upstream from said position of the assembly. At this time, since the baffle assembly 30 is moved under such a condition of maintaining the predetermined height position from the bottom 14 by the support mechanisms 32, the deposit 80 on the bottom 14 is transferred successively such as to blow together toward the side downstream the position of the baffle assembly 30 together with the movement of the baffle assembly 30. Since the baffle assembly 30 is finally moved toward the downstream end of the channel 12, the deposit 80 is collected at the most downstream position of the channel 12.

A moving speed of the cleaning apparatus 10 may be set to a speed such that a velocity of the blownoff flow 78 passing through the gap 60 reaches a predetermined value, i.e., 20 to 25 m per two or three hours, by adjusting the gap 60 between the bottom 14 and the lower edge of the blade 44, the gap 76 between the caster 72 and pad 74 of the orientation correction mechanism 34 and the side wall 28, the gap "a" between the first and second plate members and the amount of water supplied to the channel 12 or the like.

As noted above, in the step of moving the cleaning apparatus 10, the orientation correction mechanism 34 corrects the orientation which blocks the water flow when the baffle assembly 30 intends to change the orientation which does not block the flow of the water 24.

Figure 9:
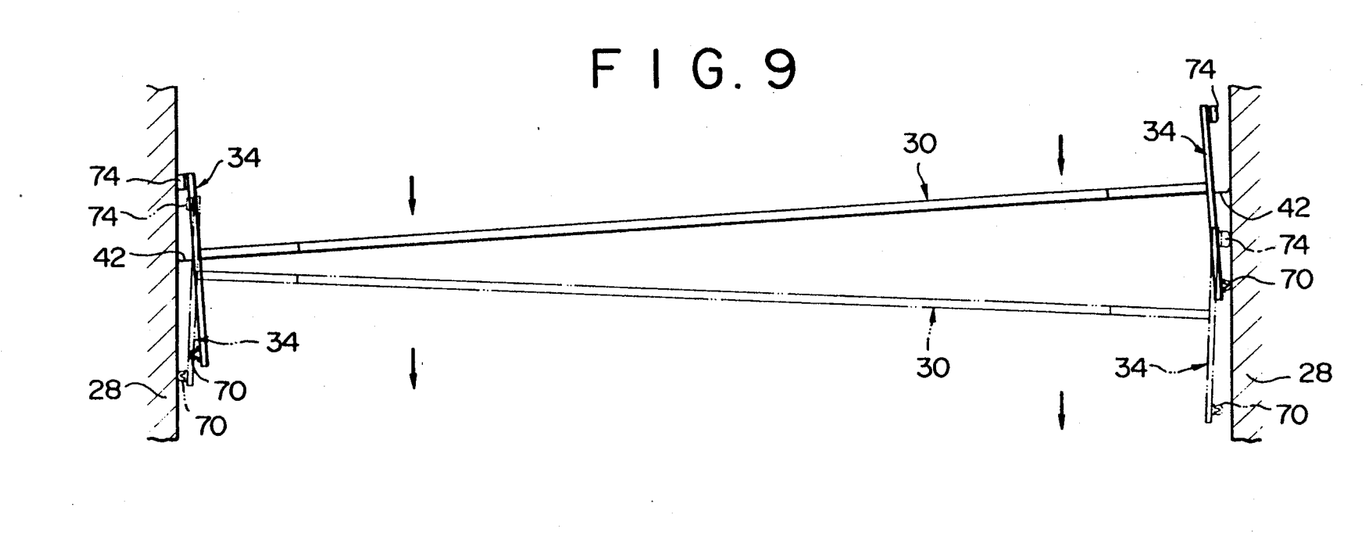
FIG. 9 is a view for explaining the principle of self-correction function of the orientation.

More specifically, as shown by solid line in FIG. 9, when the baffle assembly 30 changes into the inclined orientation in which one end widthwise of the channel 12 proceeds to the other end thereof due to a nonuniform of hydraulic pressure applied to the baffle assembly 30 and difference in the frictional resistance between each support mechanism 32 and the bottom 14, the caster 70 of the orientation correction mechanism 34 at the delay side contacts the side wall 28 and the pad 74 is apart from the side wall 28. On the contrary, the caster 70 of the orientation correction mechanism 34 disposed at the proceeding side is apart from the side wall 28 and the pad 74 contacts the side wall 28. Thus, the frictional resistance between the pad 74 of the orientation correction mechanism 34 at the proceeding side and the side wall 28 is made greater than that between the caster 70 of the orientation correction mechanism 34 at the delay side and the side wall 28. In this case, the moving speed at the delay side is made faster than that at the proceeding side due to the difference of the frictional resistance. Therefore, the orientation of the cleaning apparatus 10 may be corrected naturally to the right orientation for blocking the water flow as shown by two chain lines in FIG. 9.

Thus, while the baffle assembly 30 is moved in the channel 12 from the upstream side toward the downstream side, the deposit on the entire surface of the bottom 14 may be collected toward the downstream end. The collected deposit may be discharged to the outside of the channel through a pipe of an apparatus similar to a prior one. This discharging operation may easily removed the deposit 80 since the area to be discharged is narrower than that of the prior art apparatus for performing the operation over the entire surface of the bottom 14.

When the deposit 80 is transferred by the blownoff flow 78, there is no possibility to disturb the deposit through the water 24. Further, even when the deposit is disturbed through the water 24, it may be dispersed through the water downstream the position of the baffle assembly 30. In this case, the water downstream from the position of the baffle assembly 30 is not moved toward the side upstream the position of the baffle assembly 30 to discharge through the drop structure 18 to the outlet 20. Therefore, the water upstream from the position of the baffle assembly 30 may not be contaminated.

The fry in the channel 12 swims through the gap between the baffle assembly 30 and the bottom 14 against the blownoff flow 78 at the step of moving the baffle assembly 30 gradually, thereby moving toward the side upstream from the position of the baffle assembly 30. Therefore, the fry may not be damaged.

Further, the cleaning apparatus 10 may be moved at a speed such that the hydraulic pressure upstream from the position of the baffle assembly 30 is increased greater than that downstream at all time, i.e., the speed such that the velocity of the blownoff flow 78 reaches a predetermined value, by other force such as dynamic force.

Figure 10:
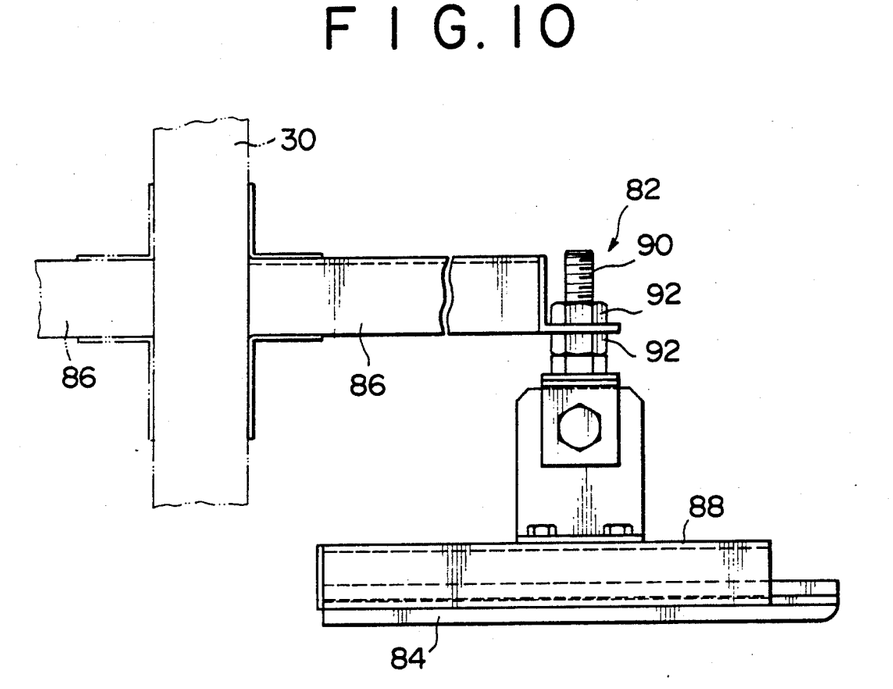
FIG. 10 is an enlarged-scale view showing a different embodiment of the support mechanism.
Figure 11:
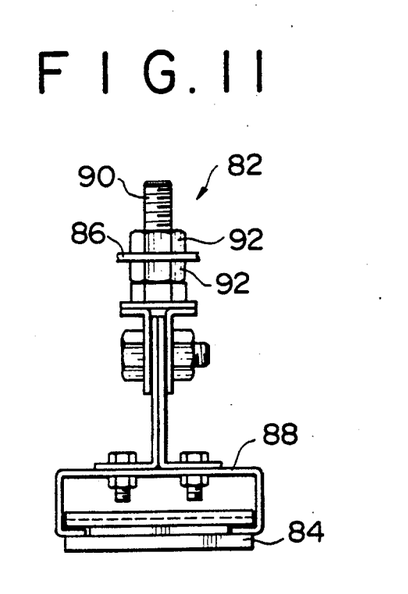
FIG. 11 is a right side view showing the support mechanism shown in FIG. 10.

A support mechanism 82 as shown in FIGS. 10 and 11 uses a pair of sides 84 made of synthetic resin material as a support member instead of the caster. The support mechanism 82 comprises a pair of arms 86 attached to the baffle assembly 30 and extending from the position opposed to the baffle assembly 30 toward the directions opposed to each other. Each bracket 88 is provided at an end of each arm 86 (one is shown in the drawing) so as to adjust the height position by a screw jack having a bolt 90 and two nuts 92. The slider 84 is attached to the bracket 88. In case when using the support mechanism 82, the dimension of the gap 60 may be adjusted by the screw jack.

The feeding channel with a width of 5.25 m and a length of 20 m is cleaned by the cleaning apparatus noted above. The typical example of the depth of water (mm) of the feeding channel, the amount of water supplied to the feeding channel per 1 min. (λ), the dimension of the gap 60 (mm) and the average time (second,minute) taken for the movement of the cleaning apparatus by 1 m when the desired cleaning effect can be obtained, is represented as the following table.

The cleaning apparatus of Nos. 1 to 3 is used with a caster with a diameter of 75 mm as the support member 58 at the upstream side and downstream side and the cleaning apparatus of Nos. 4 to 11 is used with a slider made of polyethylene resin as the support member 84 at the upstream side and downstream side. The cleaning apparatus of Nos. 12 to 15 is used with the caster with the diameter of 75 mm as the support member 58 at the upstream side and the slider made of polyethylene resin as the support member 84 at the downstream side.

TABLE

| No. | Depth of water (mm) | Amount of supply water (l) | Dimension of gap 60 (mm) | Average time (second, minute) |
| --- | --- | --- | --- | --- |
| 1 | 500 | 1000 | 20 | 6'51" |
| 2 | 600 | 1000 | 20 | 8'02" |
| 3 | 600 | 1000 | 10 | 5'42" |
| 4 | 400 | 1500 | 20 | 5'27" |
| 5 | 400 | 1500 | 20 | 4'41" |
| 6 | 500 | 1500 | 20 | 6'00" |
| 7 | 600 | 1500 | 20 | 5'53" |
| 8 | 400 | 2000 | 20 | 1'23" |
| 9 | 400 | 2000 | 20 | 2'02" |
| 10 | 500 | 2000 | 20 | 1'43" |
| 11 | 600 | 2000 | 20 | 2'50" |
| 12 | 400 | 500 | 10 | 9'09" |
| 13 | 400 | 500 | 12 | 9'01" |
| 14 | 500 | 500 | 12 | 9'50" |

Further, Nos. 4,5 and 12, 13 are different in the average time with each other irrespective for the same condition except for the average time shown in the table. This is mainly caused by the difference of the flatness of the bottom of the feeding channel where the experiments were carried out.

What is claimed is:

1. A method of cleaning a bottom of a feeding channel comprising the following steps:
   supplying a feeding channel with a flow of water which flows from an upstream end to a downstream end of said feeding channel;
   positioning a baffle having a blade-like structure extending substantially vertically and across a portion of said feeding channel orthogonally with respect to the flow of water, said baffle being movable mounted and spaced to form a gap above a bottom surface of said feeding channel, said gap being substantially shorter in height than said blade-like structure;
   imparting motion to said baffle to traverse the feeding channel in a direction from said upstream end to said downstream end
   to provide a jet of water from the gap; and
   collecting a deposit within said feeding channel by utilizing the jet of flow of water to position the deposit on said downstream end of said feeding channel for eventual removal.

2. A method of cleaning a bottom of a feeding channel according to claim 1, wherein motion is imparted to said baffle by a dynamic force applied by the flow of water.

3. A method of cleaning a bottom of a feeding channel according to claim 1, wherein motion is imparted to said baffle by an external drive source operatively connected to said baffle.

4. A method of cleaning a bottom of a feeding channel according to claim 1, wherein said baffle is positioned to extend above a level of water disposed within said feeding channel.

5. A method of cleaning a bottom of a feeding channel according to claim 1, wherein said feeding channel is generally of a circular horizontal cross section and said baffle is fixed at an end of said baffle to a central axis of the circular cross section and extends in a direction from the central axis to a periphery of the circular cross section for turning about the central axis within said feeding channel.

6. A method of cleaning a bottom of a feeding channel according to claim 1, wherein said feeding channel is substantially rectangular and said baffle extends across a dimension thereof.

7. A method of cleaning a bottom of a feeding channel according to claim 6, wherein said baffle extends substantially orthogonally with respect to the flow of water across a dimension of said feeding channel.

* * * * *